US006846150B2

(12) United States Patent
Krause

(10) Patent No.: US 6,846,150 B2
(45) Date of Patent: Jan. 25, 2005

(54) PIVOTING TRAILER HITCH

(75) Inventor: Wayne L. Krause, Uniontown, OH (US)

(73) Assignee: Waltco Truck Equipment Co., Tallmadye, OH (US)

(*) Notice: Subject to any disclaimer, the term of this patent is extended or adjusted under 35 U.S.C. 154(b) by 8 days.

(21) Appl. No.: 10/353,610

(22) Filed: Jan. 29, 2003

(65) Prior Publication Data
US 2003/0170106 A1 Sep. 11, 2003

Related U.S. Application Data

(63) Continuation of application No. 09/478,757, filed on Jan. 6, 2000, now Pat. No. 6,589,006.
(60) Provisional application No. 60/115,000, filed on Jan. 6, 1999.

(51) Int. Cl.[7] .................................................. B60P 1/44
(52) U.S. Cl. ...................................... 414/558; 414/537
(58) Field of Search .................................. 414/537, 557, 414/558; 280/491.3, 491.4; 14/71.1

(56) References Cited

U.S. PATENT DOCUMENTS

| 3,138,270 | A | | 6/1964 | McCarty |
|---|---|---|---|---|
| 3,375,946 | A | | 4/1968 | Drake |
| 3,545,791 | A | | 12/1970 | Lugash |
| 3,638,811 | A | | 2/1972 | Robinson |
| 3,666,121 | A | | 5/1972 | Denner et al. |
| 4,078,676 | A | | 3/1978 | Mortenson |
| 4,198,187 | A | | 4/1980 | Mountz |
| 4,239,275 | A | | 12/1980 | Horneys et al. |
| 4,252,373 | A | | 2/1981 | Briggs |
| 4,294,571 | A | | 10/1981 | Tordella |
| 4,930,973 | A | | 6/1990 | Robinson |
| 5,467,855 | A | | 11/1995 | Sorensen |
| 5,897,285 | A | | 4/1999 | Wanderscheid et al. |
| 6,183,187 | B1 | | 2/2001 | Ablabutyan |
| 6,244,608 | B1 | * | 6/2001 | Hess ........................ 280/149.2 |
| 6,589,006 | B1 | * | 7/2003 | Krause ........................ 414/558 |

FOREIGN PATENT DOCUMENTS

| DE | 32 28 829 A1 | 2/1984 |
|---|---|---|
| EP | 0 565 393 A1 | 3/1993 |

* cited by examiner

Primary Examiner—James W. Keenan
(74) Attorney, Agent, or Firm—Brouse McDowell; Roger D. Emerson; Heather M. Barnes

(57) ABSTRACT

A trailer hitch assembly adapted for use with a foldable liftgate assembly on a truck. The trailer hitch assembly is able to be pivoted out of the way of the liftgate assembly as the liftgate is deployed from a stowed position beneath the truck chassis. The liftgate assembly may include a foldable platform including a main platform member and a platform extension.

17 Claims, 3 Drawing Sheets

PIVOTING TRAILER HITCH

This application is a continuation of and claims the benefit of U.S. Utility patent application, Ser. No. 09/478,757, filed on Jan. 6, 2000, in Express Mail Label No. EL510434420US by the same inventor, Wayne L. Krause, entitled PIVOTING TRAILER HITCH, issued as U.S. Pat. No. 6,589,006, which claims priority to a provisional patent application having Ser. No. 60/115,000 and was filed on Jan. 6, 1999.

BACKGROUND OF THE INVENTION

1. Field of the Invention

The present invention is directed to the field of liftgate assemblies and more particularly to liftgate constructions including a pivoting trailer hitch.

2. Description of the Related Art

In the art it is known to provide trucks having various designs of liftgates mounted to the rear of the truck or carried under the truck chassis. One problem encountered in the art is that the addition of trailer hitches on the trucks limit the use of liftgates or elevating platforms. The present invention contemplates a new and improved liftgate which is simple in design, effective in use, and overcomes the foregoing difficulties and others while providing better and more advantageous overall results.

SUMMARY OF THE INVENTION

In accordance with the present invention, a new and improved liftgate is provided which overcomes difficulties associated with liftgates and provides better and move advantageous overall results.

According to one aspect of the invention, a combination liftgate assembly having a platform surface, a first pivot member about which the foldable platform assembly selectively pivots from a stowed position to an unstowed position, means for selectively moving said platform assembly from said stowed position to said unstowed position, a hitch assembly including a hitch, a second pivot member about which the hitch assembly pivots from a first position to a second position; and, means for selectively pivoting the hitch assembly about the second pivot member.

According to another aspect of the invention, the foldable platform assembly further includes a platform extension and a platform extension hinge.

According to another aspect of the invention, the hitch is carried on a first surface which is generally horizontal when the hitch assembly is in the first position and is disposed at an angle when the hitch assembly is in the second position.

According to another aspect of the invention, a hydraulic cylinder is utilized to move the hitch assembly from the first position to the second position.

According to another aspect of the invention, the combination includes a pair of opposite lift arms which carry the platform assembly.

According to another aspect of the invention, the combination includes a support pin that extends between each of the lift arms.

According to another aspect of the invention, the hitch assembly rests on the support pin in moveable relationship thereto.

One advantage of the present invention is that a truck can be equipped with both a foldable liftgate assembly as well as a trailer hitch because the trailer hitch pivots out of the way when the liftgate assembly is deployed.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangement of parts. A preferred embodiment of these parts will be described in detail in the specification and illustrated in the accompanying drawings, which form a part of this disclosure and wherein.

DESCRIPTION OF THE PREFERRED EMBODIMENT

Figure 1:
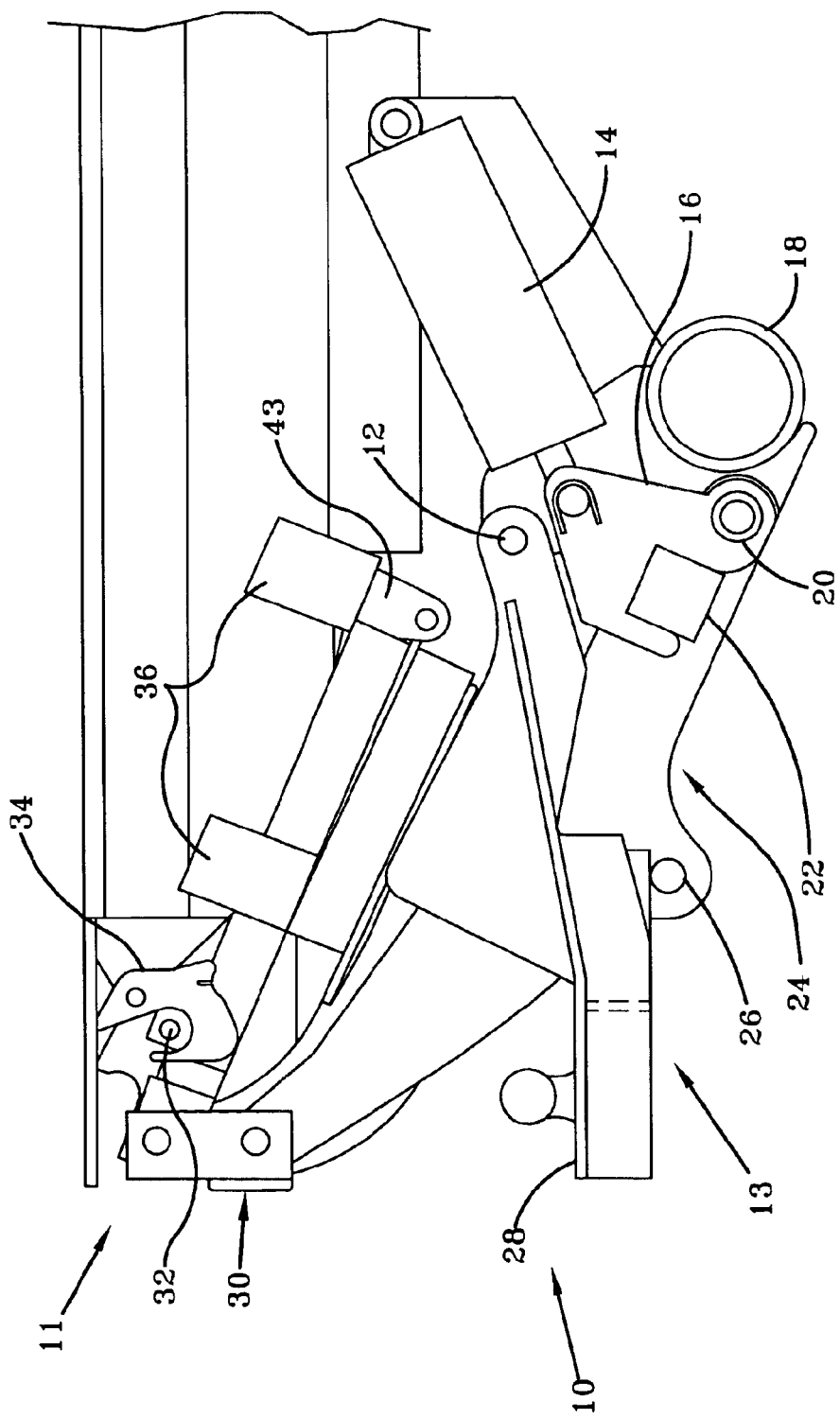
FIG. 1 is a side view of the liftgate and trailer hitch combination of the present invention.
Figure 2:
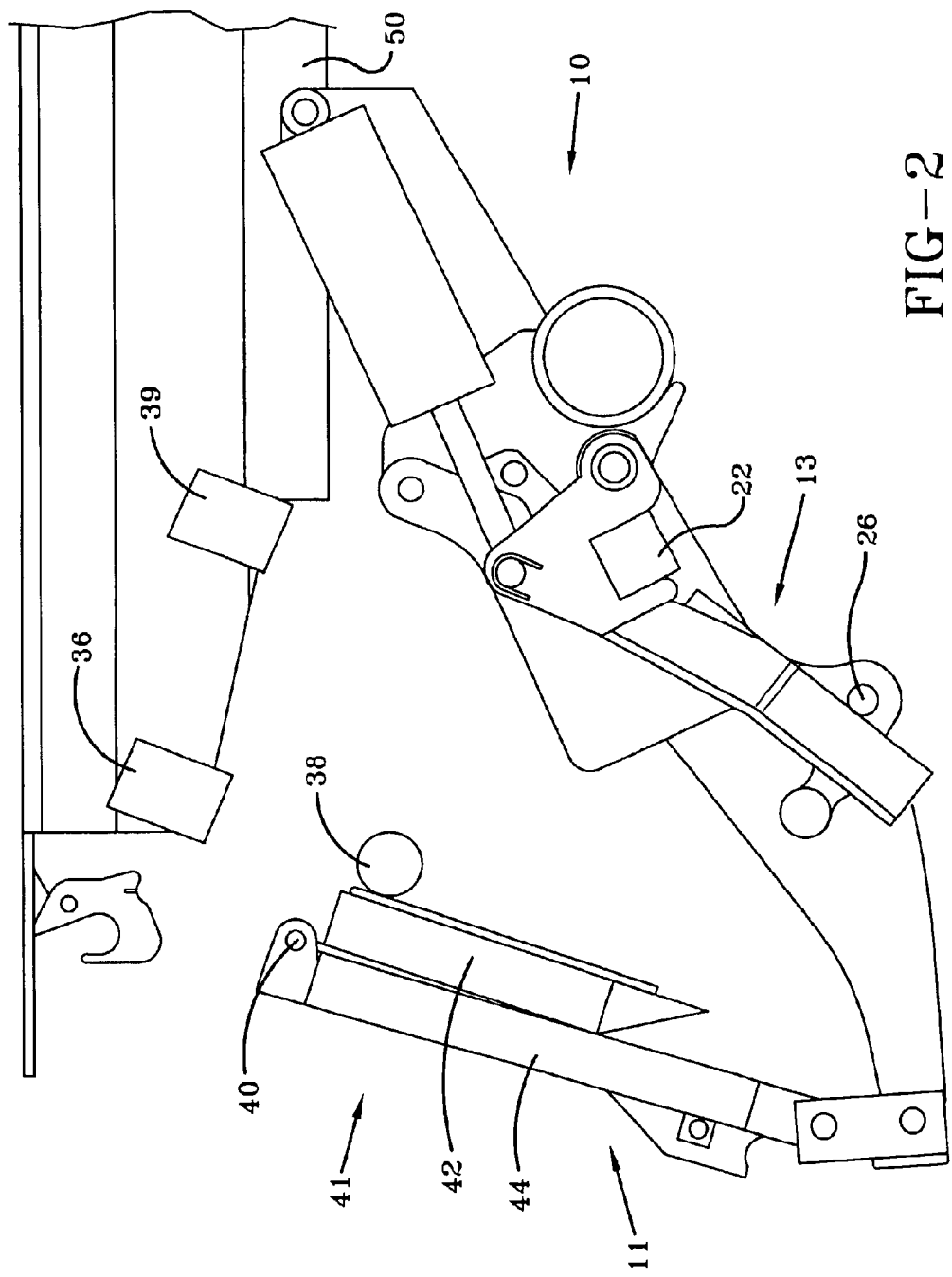
FIG. 2 is a side view of the combination of FIG. 1 where the foldable platform is partially deployed; and, FIG. 3 is a bottom view of the combination of the present invention.
Figure 3:
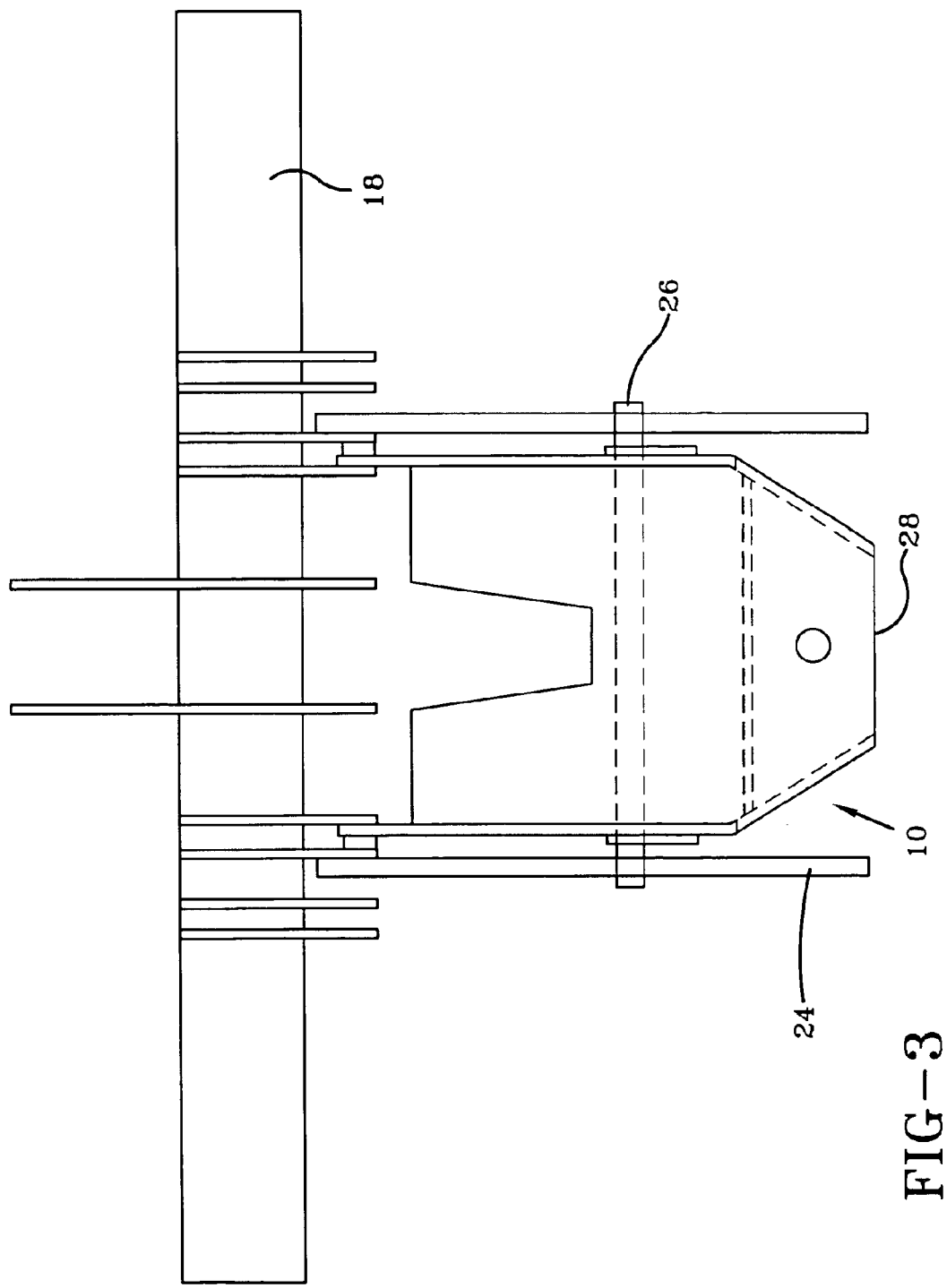

Referring now to the drawings, which are for purposes of illustrating a preferred embodiment of the invention only, and not for purposes of limiting the invention, FIG. 1 shows a side view of the liftgate/trailer hitch combination 10 of the present invention.

In the preferred embodiment, a conventional liftgate is redesigned in order to move the hydraulic cylinder out of the way. Therefore, the liftgate 11 shown in the present invention is not a standard-type liftgate within the industry. An additional pivot point is added, which is noted as a hitch pivot 12 as will be explained later in this disclosure. As in a usual folding liftgate, the present invention includes a lift arm pivot 20 that works to move the liftgate 11 from the stowed position to a deployed position. In the preferred embodiment, the hitch pivot 12 is located above the lift arm pivot 20. The hitch pivot 12 allows the hitch assembly 13 itself to pivot out of the way so that the liftgate can be deployed. The hitch pivot assembly 13 may comprise a hitch 28, a hydraulic cylinder 14, a lift cylinder clevis 16, a mount tube 18, a lift arm pivot 20, a lift tube 22, a lift arm assembly 24, and support pin 26. The support pin 26 runs across from lift arm assembly 24 to lift arm assembly 24. The lift arm assemblies 24 are located on both sides of an associated lift gate, each on one side of a truck. The hitch assembly 13 rests on the pin 26. As the lift arms 24 pivot downwardly it allows the hitch assembly 13 to pivot in a first direction as well. The hitch 28 will actually slide relative to the support pin 26.

The lift arms 24 are attached to the liftgate platform 41 and attached to the hydraulic cylinder 14 to lift a load (not shown). The lift tube 22 extends from lift arm 24 to the other lift arm 24, which is directly opposed to it, and is welded to the clevis 16 which is attached to the cylinder 14. The clevis 16 holds the lift tube 22 and in the preferred embodiment goes around three sides of the lift tube 22.

As shown in FIG. 1, in the stowed position, the liftgate 11 contacts up-stop bars 36. The platform 41 comprises two pieces that are shown folded. A platform extension hinge 40 connects the two pieces of the platform 41. The two pieces of the platform 41 are labeled as platform extension 42, and the main platform 44. The up-stop bars 36 are generally two rectangular blocks that are substantially the same size, one to about the end of the platform 41 and one to about midway on the platform 41. By limiting the platform 41 it limits the level of the hitch assembly 13. The up-stop bars are attached to a frame 50 of the vehicle.

The first up-stop bar 37, located midway on the platform 44, is actually contacting the bottom surface of the platform 41. The platform 41 has a diamond plate skin on its top side. The bar 37 butts up against the underside of this skin. The platform 41 additionally has a frame assembly around it. So the first up-stop bar 37 actually reaches down inside of the frame assembly and contacts the bottom surface of the main platform 44. The other up-stop bar 39 butts up against a cross tube 43 that runs from side to side on the main platform 44. Latch hooks 34 engages bail 32. Normally, there is only one latch hook 34, however, in this case there are two latch hooks located on opposite sides of the truck (not shown) and directly oppose one another. The reason for two latch hooks 34 is to straddle a pullout ramp (not shown) on a typical rental truck. The rental trucks typically have a loading pull out ramp that slides on the frame of the truck. Therefore, the latch hooks are located on either side of the aforementioned ramp. These latch hooks 34 engage on the platform 41 automatically as the platform 41 is folded away such that hooks 34 are spring-loaded and will engage a bail 32. It should be noted that the hooks 34 could not be located within the center of the truck because it would be in the way of the pull out loading ramp that is on this vehicle.

The platform extension 42 rotates 180 degrees to enable one to roll something onto the platform extension 42.

The hitch assembly 13 of the present invention pivots with the lift arms 24 and has to pivot out of the way of the platform 41. As the platform 41 travels and rotates downwardly, if the hitch assembly 13 were fixed and did not pivot out of the way, the platform 41 would travel downwardly on top of the hitch assembly 28 and stall out. It would not be able to go down any further. This invention is particularly adapted for use on a low bed truck having limitations of room from the bottom of the truck to the road. With this invention, there enables one to have a fixed hitch far apart without causing problems.

The mount tube 18 is located below the hydraulic cylinder 14 and there are also brackets (not shown) that mount to the tube 18 and are welded onto the vehicle frame.

The invention has been described with reference to the preferred embodiment. Obviously, modifications and alterations will occur to others upon a reading and understanding of the specification. It is intended by applicant to include all such modifications and alterations insofar as they come within the scope of equivalents thereof.

Having thus described the invention, it is now claimed:

1. In combination, a vehicle having a liftgate assembly and a trailer hitch, the combination comprising:
    a foldable platform assembly including a main platform having a platform surface;
    a first pivot member about which said foldable platform assembly selectively pivots from a stowed position to an unstowed position;
    lift arms pivotally attached to said first pivot member;
    a support pin extending between said lift arms;
    means for selectively moving said platform assembly from said stowed position to said unstowed position;
    a hitch assembly including a hitch;
    a second pivot member about which said hitch assembly pivots from a first position to a second position, said second pivot member adapted to enable said hitch to slide relative to said support pin, said support pin adapted to contact said hitch assembly when said platform assembly is in said unstowed position; and,
    means for selectively pivoting said hitch assembly about said second pivot member;
    wherein said vehicle comprises a ramp operatively connected to said frame, said ramp having first and second sides; and two oppositely disposed latch hooks attached to the first and second sides of said ramp.

2. The combination of claim 1, wherein said first pivot member defines a first axis, said second pivot member defines a second axis, and said first axis and said second axis are substantially parallel.

3. The combination of claim 1, wherein said hitch assembly is positioned over an underlying surface and maintains a spaced relationship with the underlying surface in the stowed and unstowed positions.

4. The combination of claim 1, wherein said first pivot member is a lift arm pivot.

5. The combination of claim, wherein said second pivot member is located above said first pivot member.

6. The combination of claim 1, wherein said foldable platform assembly further comprises a platform extension pivotally connected to said main platform.

7. The combination of claim 6, wherein said platform extension is adapted to rotate 180 degrees.

8. The combination of claim 1, wherein said hitch assembly is in constant contact with said support pin when said platform is in the stowed and unstowed position.

9. In combination, a vehicle having a liftgate assembly and a
    trailer hitch, the combination comprising:
    a foldable platform assembly including a main platform having a platform surface;
    a first pivot member about which said foldable platform assembly selectively pivots from a stowed position to an unstowed position;
    lift arms pivotally attached to said first pivot member;
    a support pin extending between said lift arms;
    a hitch assembly including a hitch;
    a hydraulic cylinder adapted to selectively move said platform assembly from said stowed position to said unstowed position; and,
    a hitch pivot member about which said hitch assembly pivots from a first position to a second position, said hitch assembly adapted to rest on said support pin when said foldable platform assembly is in said stowed and unstowed positions, said hitch pivot member adapted to enable said hitch assembly to slide relative to said support pin, said hydraulic cylinder also adapted to selectively pivot said hitch assembly about said hitch pivot member;
    wherein said vehicle further comprises:
    a ramp operatively connected to said frame, said ramp having first and second sides; and,
    two oppositely disposed latch hooks attached to the first and second sides of said ramp.

10. The combination of claim 9, wherein said vehicle comprises:
    a frame; and,
    a first up-stop bar attached to said frame.

11. The combination of claim 10, wherein said first up-stop bar contacts said main platform midway on said main platform.

12. The combination of claim 11, wherein said first up-stop bar contacts the inside surface of said main platform.

13. The combination of claim 10, wherein said vehicle further comprises a second up-stop bar attached to said frame, said second up-stop bar contacts a cross tube, said cross tube attached to said main platform.

14. The combination of claim 9, wherein said latch hooks are adapted to engage said platform assembly.

15. The combination of claim 9, wherein said latch hooks are spring loaded.

16. The combination of claim 9, wherein said latch hooks are adapted to receive a bail to support said platform in the stowed position.

17. The combination of claim 9, wherein said vehicle is a low bed truck.

* * * * *